United States Patent
Nair

(10) Patent No.: US 10,121,187 B1
(45) Date of Patent: Nov. 6, 2018

(54) GENERATE A VIDEO OF AN ITEM

(71) Applicant: Amazon Technologies, Inc., Reno, NV (US)

(72) Inventor: Krishna Kiran Gangadharan Nair, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1183 days.

(21) Appl. No.: 14/302,556

(22) Filed: Jun. 12, 2014

(51) Int. Cl.
  *G06Q 30/06* (2012.01)

(52) U.S. Cl.
  CPC ..... *G06Q 30/0643* (2013.01); *G06Q 30/0625* (2013.01); *G06Q 30/0633* (2013.01)

(58) Field of Classification Search
  CPC ........... G06Q 30/0643; G06Q 30/0625; G06Q 30/0633
  USPC ....................................................... 705/26.62
  See application file for complete search history.

(56) References Cited

U.S. PATENT DOCUMENTS

| 8,682,739 B1* | 3/2014 | Feinstein | G06Q 30/06 705/26.1 |
| 9,020,244 B2* | 4/2015 | van Zwol | G06K 9/00751 382/159 |
| 9,275,001 B1* | 3/2016 | Liebald | G06F 17/30702 |
| 2006/0233522 A1* | 10/2006 | Hiroi | H04N 5/783 386/241 |
| 2008/0092189 A1* | 4/2008 | Baker | G06Q 30/02 725/112 |
| 2009/0187485 A1* | 7/2009 | Loui | G06Q 30/0225 705/14.26 |
| 2009/0265737 A1* | 10/2009 | Issa | G06F 17/30817 725/38 |
| 2010/0145820 A1* | 6/2010 | Johnson | G06Q 30/00 705/26.1 |
| 2011/0099069 A1* | 4/2011 | Hoelz | G06Q 30/02 705/14.55 |
| 2011/0194839 A1* | 8/2011 | Gebert | G11B 27/034 386/290 |
| 2011/0219098 A1* | 9/2011 | Xu | H04N 21/85406 709/219 |
| 2011/0231260 A1* | 9/2011 | Price | G06Q 30/02 705/14.61 |
| 2011/0292288 A1* | 12/2011 | Deever | G06F 17/30784 348/590 |
| 2013/0019261 A1* | 1/2013 | Huber | G06Q 30/08 725/32 |
| 2013/0036442 A1* | 2/2013 | Wingert | H04N 21/42209 725/60 |

(Continued)

OTHER PUBLICATIONS

Anonymous, LSI Logic Announces Industry's First User_Programmable MPEG-2 Encoder Chipset, Mar. 21, 1996, PR Newswire, 321SJTH002 (Year: 1996).*

*Primary Examiner* — Jason B Dunham
*Assistant Examiner* — Brittany E Bargeon
(74) *Attorney, Agent, or Firm* — Kilpatrick Townsend & Stockton LLP

(57) ABSTRACT

Techniques for generating and updating a video may be provided. For example, a video may be used in association with providing information about an item. Based on user interactions related to how users may view the video and decisions of users to order the item, the video may be updated. Updating the video may include rearranging segments of the video, modifying a length of a particular segment, or editing content of the particular segment.

20 Claims, 8 Drawing Sheets

(56) References Cited

U.S. PATENT DOCUMENTS

| | | | |
|---|---|---|---|
| 2014/0244828 A1* | 8/2014 | Besehanic | H04L 65/602 709/224 |
| 2014/0258029 A1* | 9/2014 | Thierry | G06Q 30/0643 705/26.8 |
| 2014/0258039 A1* | 9/2014 | McDevitt | G06Q 30/0623 705/26.61 |
| 2014/0282661 A1* | 9/2014 | Martin | H04N 21/23418 725/18 |
| 2014/0282743 A1* | 9/2014 | Howard | H04N 21/47815 725/60 |
| 2015/0242917 A1* | 8/2015 | Curtis | G06Q 30/0242 705/26.41 |

* cited by examiner

GENERATE A VIDEO OF AN ITEM

BACKGROUND

More and more users are turning to network-based resources, such as electronic marketplaces, to purchase items. A network-based resource may provide a user experience unmatched by a more traditional brick and mortar store. For example, the network-based resource may offer a larger and more diverse selection of items. Further, for some of the items, there may be a number of sellers with different offers. As such, a consumer may not only obtain items from an available rich selection, but may also obtain the items at the most convenient offers.

Typically, a consumer may operate a computing device to access a network-based resource, search for available items, get related descriptions, and purchase one or more items accordingly. Thereafter, purchased items may be delivered to an address or location identified by the consumer.

BRIEF DESCRIPTION OF THE DRAWINGS

Various embodiments in accordance with the present disclosure will be described with reference to the drawings, in which.

DETAILED DESCRIPTION

Figure 1:
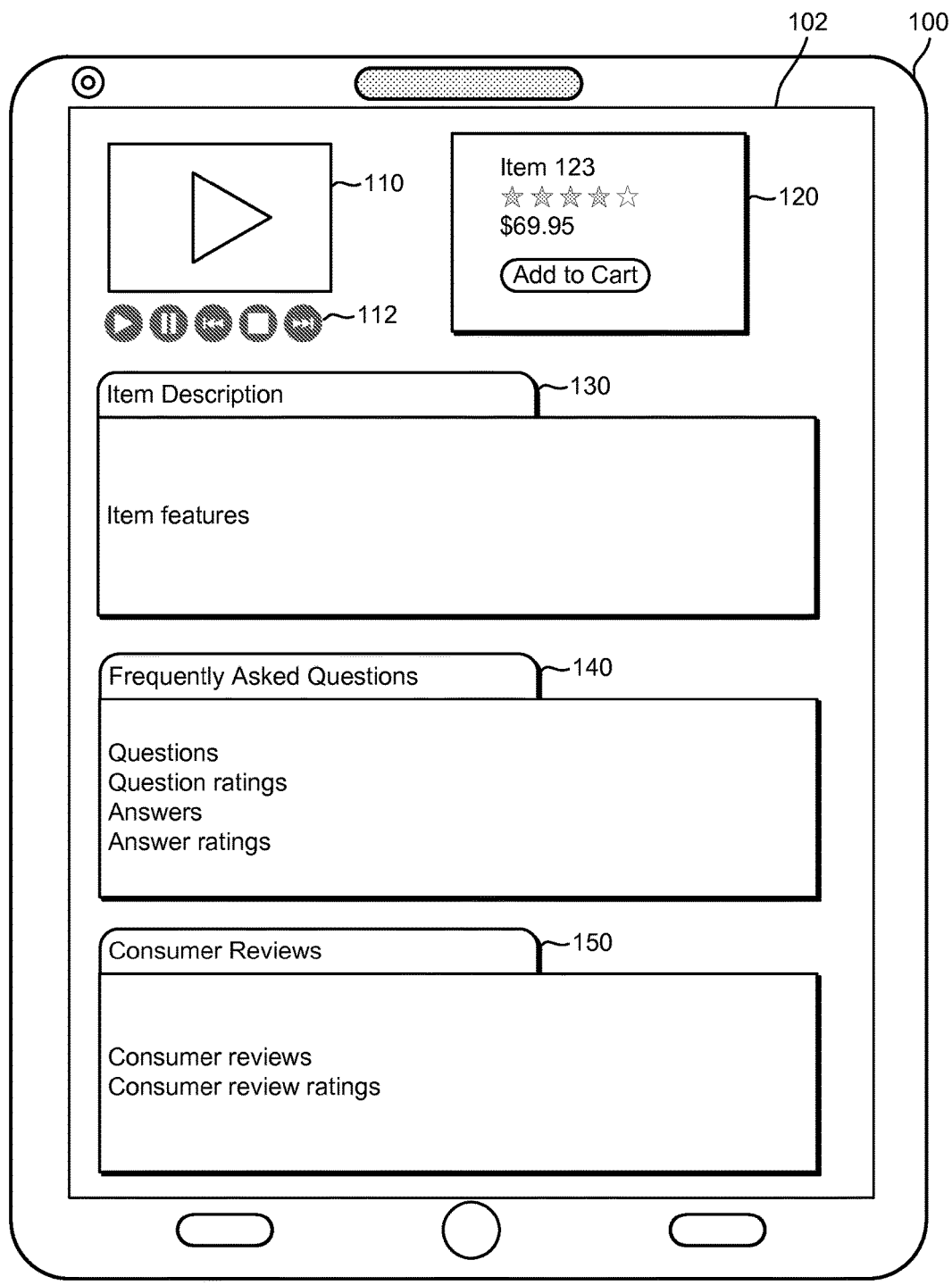
FIG. 1 illustrates an example computing device for presenting information about an item to a consumer, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing a consumer's experience when, for example, ordering an item offered at an electronic marketplace. Specifically, a video service may be implemented for presenting information about the item to help a consumer make an order or purchase decision. The presented information can include a video, such as a slideshow of images or an animation, showing various features of the item that may be of interest to the consumer. More particularly, the video service may analyze various sources of information, such as a description of the item, consumer reviews, and frequently asked questions and answers, to determine the features of interest. The video service may also collect images of the item showing these features and may arrange the images in a particular sequence to generate the video. The particular sequence may be based on relevance of the features (e.g., to the consumer). For example, an image about a most interesting feature may be shown first. The video can also include audio and/or text describing the features.

Once generated, the video service may publish the video on a network-based resource of the electronic marketplace, such as on a web page providing information about the item. By operating a computing device, the consumer can access the network-based resource and make a decision regarding ordering the item from the electronic marketplace. The video service can track various aspects of interactions between the computing device and the network-based resource or, more generally, between the consumer and the electronic marketplace. For example, the video service can store metrics about viewing the video such as which portions of the video the consumer viewed, how much time the consumer spent viewing the different portions, and other data. Similarly, the video service can store metrics about the consumer's decision to order the item or not. Based on this tracking and tracking of similar information across other consumers and/or items, the video service can update the video. For example, the video service can determine that another sequence of images, additional or fewer images, and/or different text or audio files may be more effective in presenting information about the item and, ultimately, in helping consumers with making order and/or purchase decisions. Accordingly, the video service can update and republish the video at the network-based resource.

To illustrate, a web page of an electronic marketplace may offer a wristwatch to consumers. The web page may include a video showing different images of the watch. Based on an analysis of a description, consumer reviews, and/or frequently asked questions about the watch, a video service may determine that the strap length may be a highly relevant feature. Thus, in an introductory portion of the video, the video service may include a side view image of the watch with text explaining that the wristband (or strap) is six inches long. Tony, a potential consumer, may be interested in learning more about the watch and may view the video. The video service may track whether Tony spent time viewing the wristband length or whether Tony skipped that portion of the video and focused more on another portion showing available wristband colors. The video service may also track whether Tony purchased the watch or not. Based on this tracked information and similar information for other consumers and/or other similar watches, the video service may determine that showing the available colors of the wristband first may be more relevant to potential consumers. Accordingly, the video service may re-arrange the portions of the video.

In the interest of clarity of explanation, the embodiments are described in the context of an electronic marketplace, service providers, items, merchants, and consumers. Nevertheless, the embodiments may be applied to any network-based resource (e.g., a web site or a web page), any item that may be tangible (e.g., a product) or intangible (e.g., a service or a digital product), any service provider (e.g., a provider of a network-based resource or a provider that may provide an item), any merchant (e.g., an item provider, a seller, or any user offering an item at an electronic marketplace), and/or any consumer (e.g., an item recipient, a buyer, or any user reviewing, ordering, obtaining, purchasing, or returning an item). More particularly, the embodiments may allow a video service to generate a video about an item and, based at least in part on user interactions associated with viewing the video and/or ordering the item, update the video. These and other features are further described herein below with reference to the figures.

Turning to FIG. 1, that figure illustrates an example computing device 100 that may be configured to allow a consumer to view information about an item and to make an order or purchase decision. More particularly, the consumer may operate the computing device 100 to perform various interactions with an electronic marketplace, such as to search, view, purchase, ask questions, provide answers, and review the item. The electronic marketplace may implement a video service, similar to the one described herein above. In response to a consumer interaction, the electronic marketplace may cause the computing device 100 to present information about the item. An example electronic marketplace is further described in FIGS. 3 and 4.

To facilitate the consumer interactions, the computing device 100 may be configured to provide a user interface 102 that may use touch screen and other technologies. The user interface 102 may include one or more windows that may display outputs of and may allow inputs to one or more processes. A web browser is an example of such processes and may be configured to present various types of information about the item such as a video 110, a summary 120, an item description 130, frequently asked questions 140, and consumer reviews 150. For example, the computing device 100 may execute the browser and connect to the electronic marketplace to retrieve and display the information on the user interface 102. It should be apparent to a person of ordinary skill in the art that other processes may be used such as, for example, an application programming interface (API). Also, it should be apparent to a person of ordinary skill in the art that, although FIG. 1 illustrates the information as being simultaneously displayed in a same window of the user interface 102, this simultaneous presentation may not be necessary. Instead, some of the information may be presented in separate windows of the user interface 102.

The video 110 may include a dynamic presentation, such as a sequence of images or an animation, about an item and may provide information about relevant features of the item. For example, the video 110 may include text and/or audio files describing features that may be of interest to consumers. An example video is further described in FIG. 2. The consumer may operate control buttons 112 to view the video 110. For example, the consumer can play, pause, rewind, stop, forward, or skip portions of the video 112. The video service may track these user interactions.

In comparison, prior systems may present images about an item, but these images may not be animated or presented in a video and may not include information about relevant features. Instead, a consumer may have to search for or browse other sources to find the relevant information. As such, by implementing the video service to provide the video 110, a consumer's experience may be enhanced by presenting the relevant information right there and right then.

The summary 120 may include a brief description of the item, such as a title, a rating, and a price. The summary 120 may also facilitate the functionality to purchase or order the item. For example, an "add to cart" button, or another button, can be provided. The video service may also track these user interactions (e.g., whether the button was activated).

The item description 130 may include a more detailed description of the item. For example, the item description 130 may list various features of the item, identify one or more merchants offering the item, and compare the item to other items. Typically, a service provider of the electronic marketplace and/or the merchants offering the item may provide data that can be used to generate the item description 130. In an embodiment, consumers may also provide similar data. The video service may analyze the item description 130 to determine what features may be of interest to consumers and may accordingly generate and/or update the video 110.

The frequently asked questions 140 may include questions and answers about the item. The frequently asked questions 140 may also include ratings of the questions and ratings of the answers. A question may represent a request for information about a particular feature of the item. An answer may represent information about that particular feature. A rating may represent an assessment of how relevant or helpful a question or an answer may be. Typically, consumers may provide data that can be used to generate the questions, the ratings of the questions, and the ratings of the answers. In comparison, consumers, merchants, and/or the service provider may provide data that can be used to generate the answer. For example, after viewing the video 110, the summary 120, the item description 130, and/or the consumer reviews 150, if a description of the particular feature is not found, a consumer may ask a corresponding question and another consumer may provide a corresponding answer. Subsequent consumers may rate the question and the answer. The video service may analyze the frequently asked questions 140 to determine which features may be of interest to consumers and may accordingly generate and/or update the video 110.

The consumer reviews 150 may include reviews of the item and ratings of the reviews. A review may represent a subjective or objective assessment of a particular feature of the item. A rating of the review may represent an assessment of how relevant or helpful the review may be. Typically, consumers may provide data that can be used to generate the reviews and the ratings. In an embodiment, merchants, and/or the service provider may provide such data. The video service may also analyze the consumer reviews 150 to determine what features may be of interest to consumers and may accordingly generate and/or update the video 110.

Hence, by operating the computing device 100 to interact with the electronic marketplace, the consumer may not only receive information about an item, but this information may include a video that can dynamically present information about relevant features of the item. As such, the consumer may make a better informed order or purchase decision. Example flows that the video service may implement to generate and update the video are further described in FIGS. 5-7.

Figure 2:
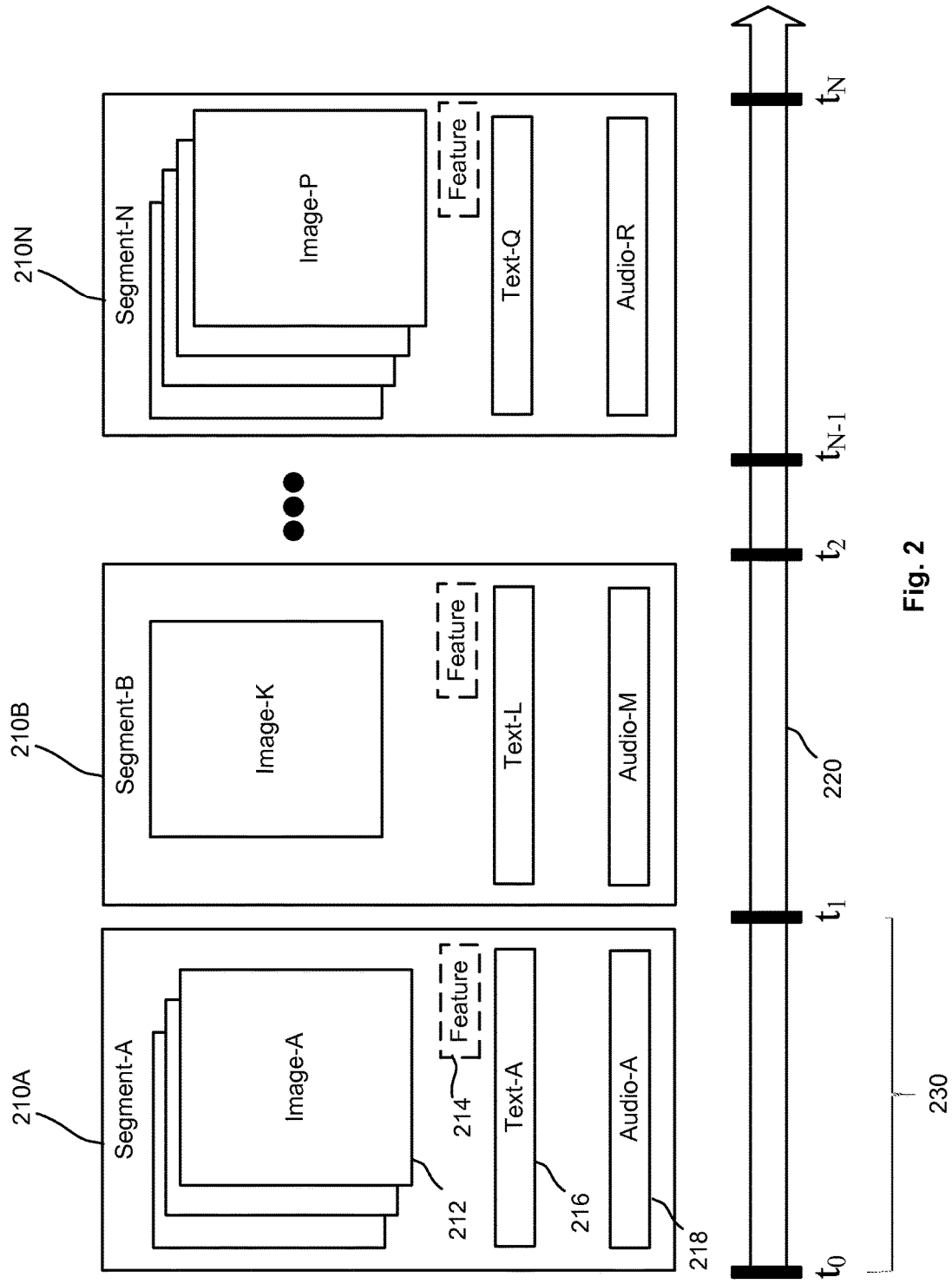
FIG. 2 illustrates an example video for presenting information about an item, according to embodiments.

Turning to FIG. 2, that figure illustrates an example video, similar to the video 110 of FIG. 1. Generally, a video can include a presentation configured to dynamically display information about an item. In the interest of clarity of explanation, a video that may include a sequence of images and associated text and audio files is illustrated in FIG. 2 as an example. However, embodiments are not limited to such a video, but can include other types of video. For example, a slideshow, an animation, an image with an overlay text or audio files activated by hovering over the image, or dynamic content of a web page can also be examples of a video.

As illustrated, a video of an item can include a plurality of segments 210A-210N ordered in a sequence 220. Each segment may correspond to one or more portions of the video and may have a certain length 230. In general, a segment can focus on a feature or a set of features of the item or can provide a different view of the item. In other words, a segment can provide a scene focusing on certain aspects of the item. For example, the segment 210A may focus on showing a particular feature of an item (e.g., a watch wrist), while the segment 210B may focus on showing a different feature (e.g., watch hands). In another example, the segment 210A may show a side view of the item, while the segment 210B may show a top view.

The number of segments may depend on the complexity of the item. Typically, the more complex an item may be, the more relevant features that item may have, and, thus, the number of segments may be greater. The sequence 220 may represent an order in which the segments 210A-N may be arranged. The length 230 may represent a presentation length for viewing the corresponding segment (e.g., a two second segment may indicate that the segment can be played for two seconds at a regular frame rate). As shown in FIG. 2, the length 230 of the segment 210A may be equivalent to $t_1$-$t_0$, where $t_0$ and $t_1$ can represent a start time and an end time of the segment 210A, respectively.

Figure 5:
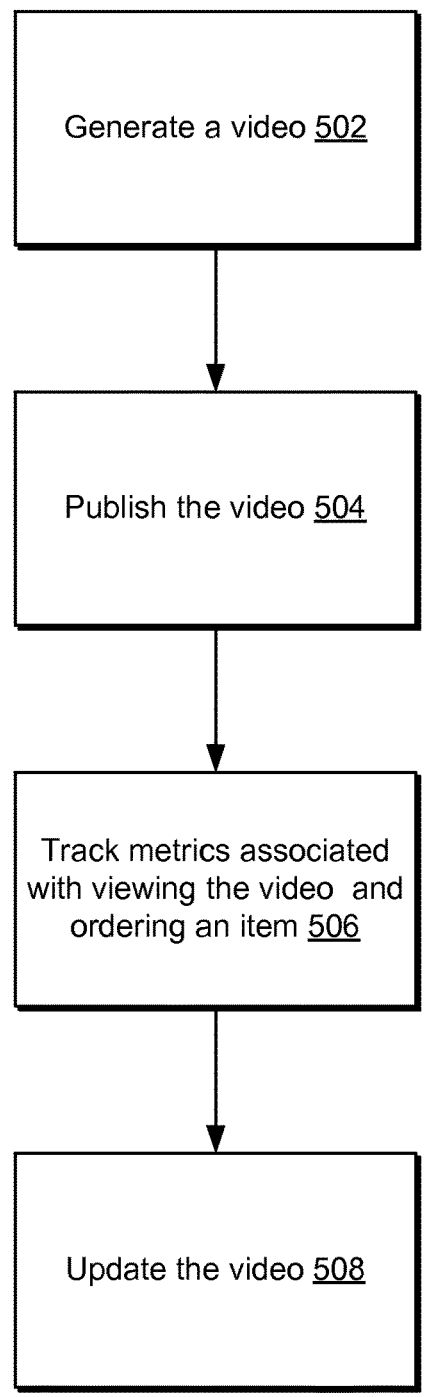
FIG. 5 illustrates an example flow for presenting information about an item, according to embodiments.
Figure 6:
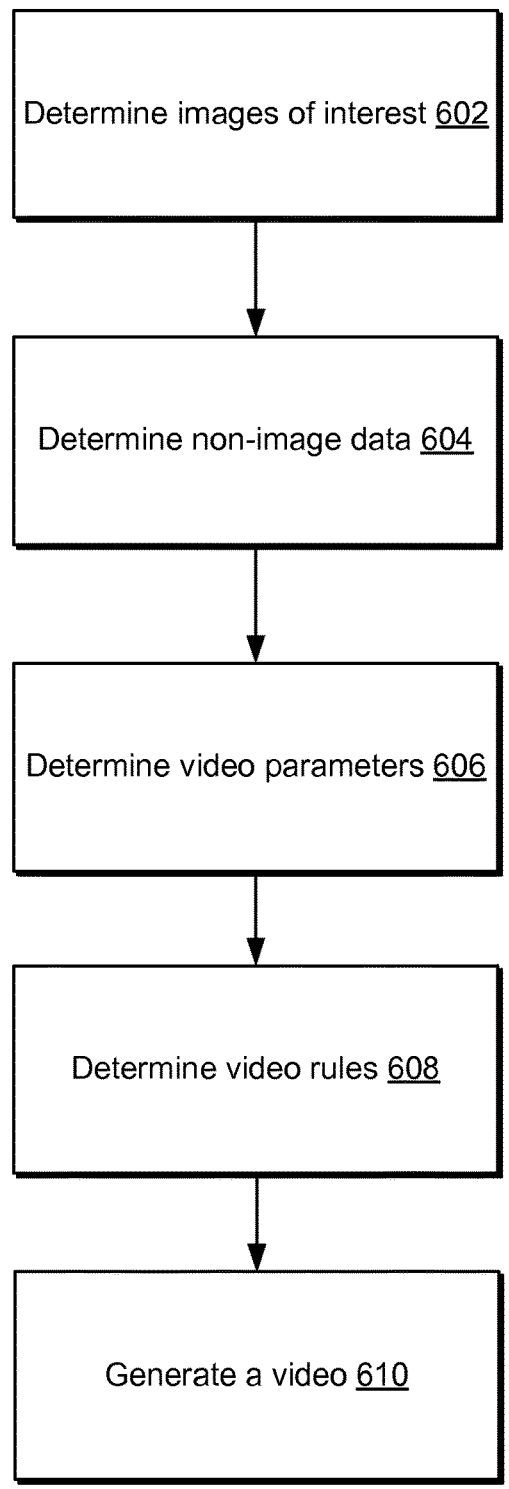
FIG. 6 illustrates an example flow for generating a video of an item, according to embodiments.
Figure 7:
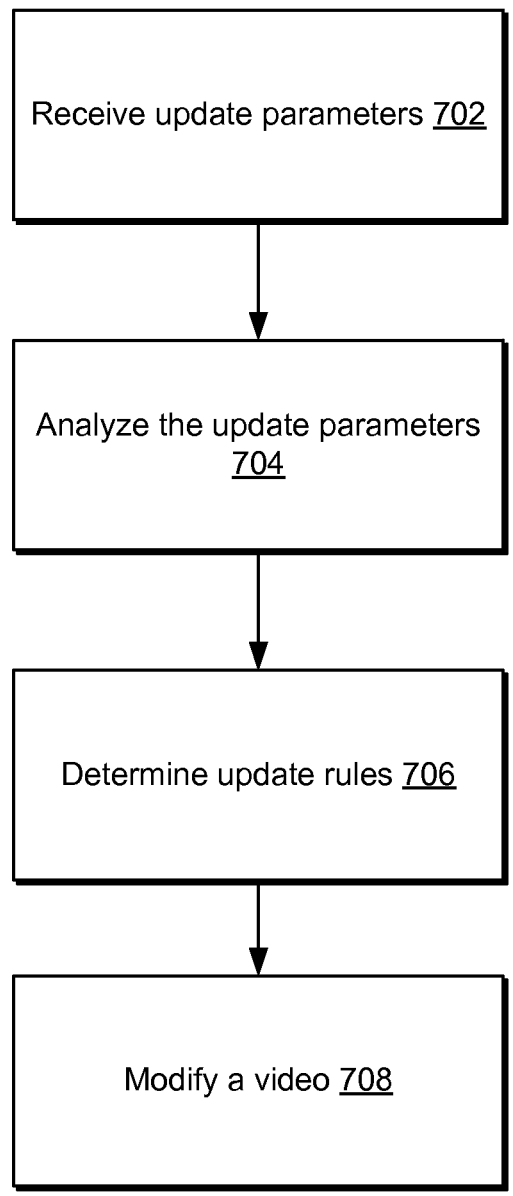
FIG. 7 illustrates an example flow for updating a video of an item, according to embodiments.

The video service may carefully select, set, and/or update the sequence 220 and the length 230 (for all or some of the segments 210A-N) as further described in the example flows of FIGS. 5-7. Briefly, the sequence 220 and the length 230 may impact the consumer's experience. For example, if properly configured, the sequence 220 and the length 230 may help the consumer with making an order or purchase decision.

The video service can use video parameters and rules to configure the sequence 220 and the length 230. As described herein above, each segment may be associated with at least one particular feature of the item. The video service may rank how relevant or important each of the features may be relative to consumers. The rules may specify that, for example, the segments 210A-N should be arranged according to the relevance of the associated features. Thus, the video service may configure the sequence 220 such that the most relevant segment (e.g. the segment associated with the most relevant feature) can be shown first, followed by the next more relevant segment, and so on until showing the segment with the least relevance. The rules may also specify that the length 230 of a segment may be a function of the relevance of the segment. As such, the video service may configure the length 230 such that the most relevant segment may have the longest length while the least relevant segment may have the shortest length.

To illustrate, consider an example of a video for showing a wristband and hands of a watch. In this example, assume that the total length of the video can be no more than thirty seconds. The video service may generate a video out of the images such that there may be a segment for displaying images of the wristband and another segment for displaying images of the hands. If the video service determines that the wristband is twice as important to consumers as the hands, the video service may show the images of the wristband first, for a twenty second time period, and may then show the images of the hands for the remaining 10 second time period.

Turning to the components of each segment in more detail, these components may include an image 212, an identifier of a feature 214, a text 216, and an audio file 218. As shown with solid lines, when the segment is displayed by a computing device to a user, the image 212 and the text 216 may be displayed and the audio file 218 may be played. The image 212 may show the feature 214, while the text 216 and the audio 218 may describe the feature 214. In comparison and as shown with the dashed lines, the identifier of the feature 214 may or may not be displayed. In particular, the identifier may not be displayed but can be used instead to associate the segment with the relevant feature 214 that the segment may focus on. This may allow the video service to configure the sequence 220, the length 230, or to edit content of the segment (e.g., remove the image 212, update the text 214, or modify the audio file 218) based on, for example, the relevance of the feature 214. In another embodiment, the identifier can also be displayed in association with displaying the segment. For example, the identifier can bring to attention (e.g., highlight, point with an arrow) the feature 214 in the image 212 for which the text 216 and/or audio files 218 may be provided.

As illustrated in FIG. 2, there can be one or more images per segment, and the number of images may vary across the segments 210A-N. The image(s) 212 in a segment may relate to one or more features. Similarly, there may be one or more texts and one or more audio files per segment. An image may be associated with one or more texts and/or one or more audio files. Further, a text may be associated with one or more images and/or one or more audio files. Similarly, an audio file may be associated with one or more images and/or one or more texts. The video service may configure the arrangement of images, texts, and audio files within each segment based on the relevance of the associated feature.

Further, if a segment includes more than one image, the video service may arrange the images for display using different techniques. For example, the images may be displayed simultaneously in a tile arrangement. In this example, the images may be sized equally or the size of each image may depend on how well the image may show the feature associated with the segment. For instance, the better the feature may be shown (e.g., an image zooming in on the feature may show that feature better than a zoomed out image), the larger the corresponding image may be made. In another example, the images may be displayed sequentially for the length 230 of the corresponding segment. In this example, the order of the images and the length for displaying each image may vary too, depending on how well each image may show the feature associated with the segment. For example, the better the feature may be shown, the earlier in the segment and for a longer display time the corresponding image may be shown. Similar techniques may be applied to display identifiers of features and/or texts.

The video service may capture the various components of the video in a document and may associate the document with a network-based resource (e.g., a web page) of an electronic marketplace offering the item. When a consumer operates a computing device to access the network-based resource, the video can be displayed by the computing device based on the document. For example, the video service may generate an extensible markup language (XML) document defining the video. The XML document may describe the segments 210A-N and the sequence 220. Also, for each of the segments 210A-N, the XML may describe the length 230, the images 212, the features 214, the texts 216, and the audio file 218. When accessing the network-based resource, the computing device may execute a rendering tool (e.g., a browser rendering engine, Adobe® Flash Player®, or some other rendering tool) to render the video based on the XML document.

Figure 3:
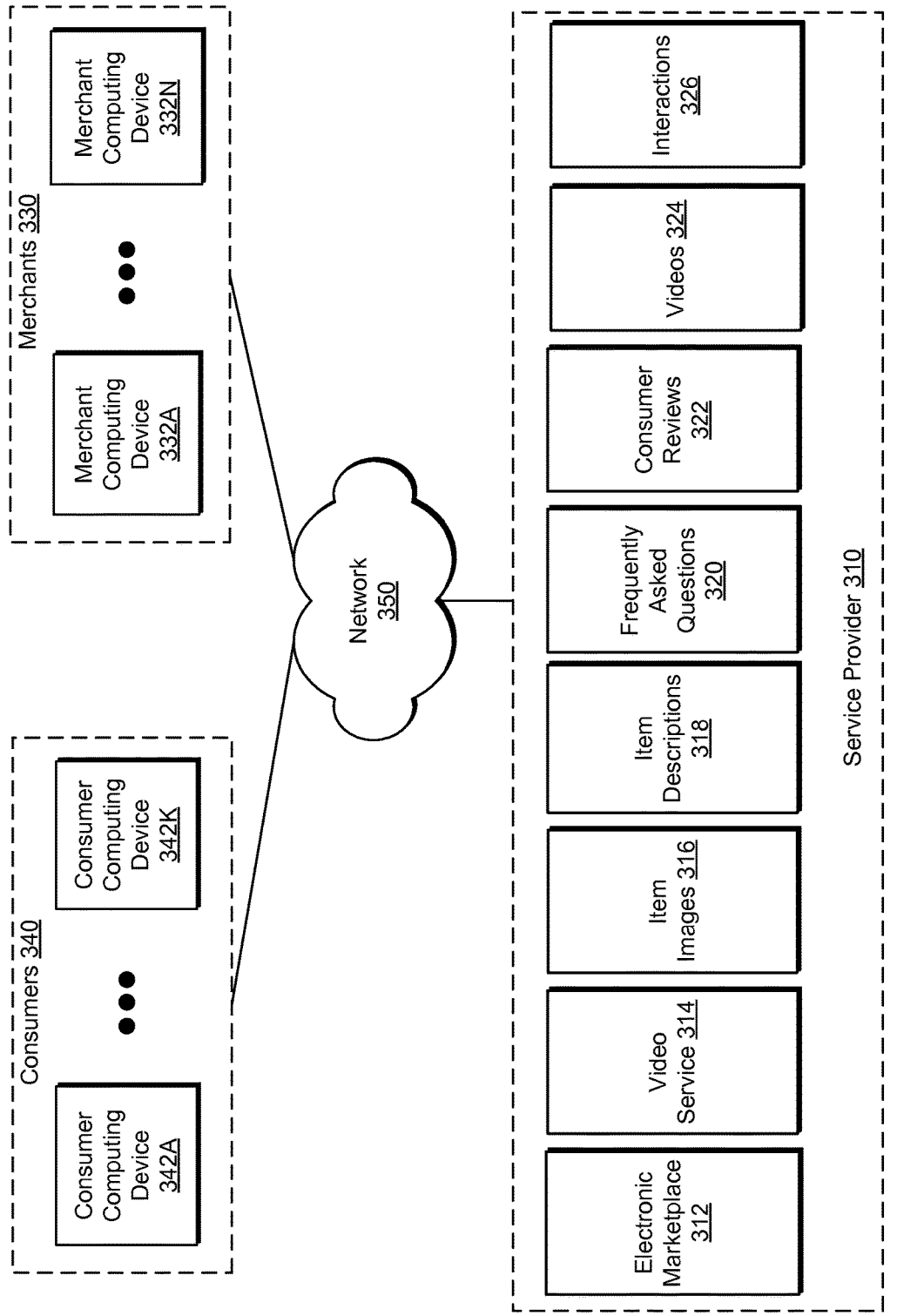
FIG. 3 illustrates an example network-based resource in association with an electronic marketplace, according to embodiments.

Turning to FIG. 3, that figures illustrates a computing environment for implementing a video service within the context of an electronic marketplace. In particular, a video service, similar to the one described herein above may be implemented to generate videos about items based on user interactions at the electronic marketplace and to update the videos based on user interactions associated with viewing the videos and/or purchasing decisions. As illustrated, the computing environment may be configured to allow a service provider 310 of an electronic marketplace 312 to implement a video service 314 to generate videos 324.

The video service 314 may be configured to analyze item images 316, item descriptions 318, frequently asked questions 320, and/or consumer reviews 322 to generate the videos 324. Similarly, the video service 314 may be configured to analyze this information and/or interactions 326 to update the videos 324. In an embodiment, the video service may track and store the item images 316, item descriptions 318, frequently asked questions 320, consumer reviews 322, and/or interactions 326. In another embodiment, other services may be implemented to track and store this information and the video service 314 may access the information from storage or may interface with these services to receive the information.

The item images 316 may include images of the items offered at the electronic marketplace 312. In comparison, the item descriptions 318 may include descriptions of features of the items. The images and the descriptions may be provided by merchants 330, consumers 340, the service provider 310, or third parties, or may be retrieved from resources external to the electronic marketplace (e.g., from third party web sites). The frequently asked questions 320 may include questions about features of items, answers to questions, ratings of questions, and ratings of answers. Similarly, the consumer reviews 322 may include reviews of features of items. The questions, images, ratings, and reviews may be provided by the merchants 330, the consumers 340, the service provider 310, or third parties, or may be retrieved from resources external to the electronic marketplace (e.g., from third party web sites). The interactions 326 may include various categories of user interactions. In a first category, the user interactions may represent data indicative of how users, such as consumers, may view the videos 324. For example, the data may include information indicating if a user plays, pauses, rewinds, stops, forwards, and/or skips portions of the videos 324. The data may also include information indicating how long and how frequent a user may play, pause, rewind, stop, forward, and/or skip a particular portion of a video. In a second category, the user interaction may represent data indicative of order or purchase decisions. For example, the data may include information indicating whether a user (e.g., a consumer) ordered an item or not. The data may be further refined to a more granular level to include information indicating whether the user ordered the item or not in association with interacting with a corresponding video (e.g., after playing the video about the item, a portion of the video, or skipping through different portions of the video). This information may also include attributes of the user, such as whether the user may have a certain membership at the electronic marketplace, spending habit, location, and other user attributes.

A network-based resource (e.g., a web page) of the electronic marketplace 312 may be associated with an item. For example, the network-based resource may allow the merchants 330 and/or the service provider 310 to provide information for ordering an item. The network-based resource may also allow the consumers 340 to review this information and make an order or purchase decision. In an example, the network-based resource may present the item images 316, item descriptions 318, frequently asked questions 320, consumer reviews 322, and/or videos 324 related to that item.

As such, the service provider 310 may operate the electronic marketplace 312 to facilitate interactions between the service provider 310, the merchants 330 and the consumers 340 over a network 350. A merchant may include an item provider, a seller, or any user interfacing with the electronic marketplace 312 for offering items. Each one of the merchants 330 may operate one or more merchant computing devices 332A-N to access the electronic marketplace 312 and perform various merchant-related functions. A consumer may be an item recipient, a buyer, or any user reviewing, browsing, ordering, obtaining, purchasing, or returning an item of a merchant. Each one of the consumers 340 may operate one or more consumer computing devices 342A-K to access the electronic marketplace 312 and perform various consumer-related functions. An item may include a tangible product (e.g., a clothing item, a music file), a consumer service (e.g., a dry cleaning service, a music recommendation service), or other items. As the consumers 340 interact with the electronic marketplace 312, the video service 314, or some other service, may store data related to the interaction as the interactions 326.

Figure 4:
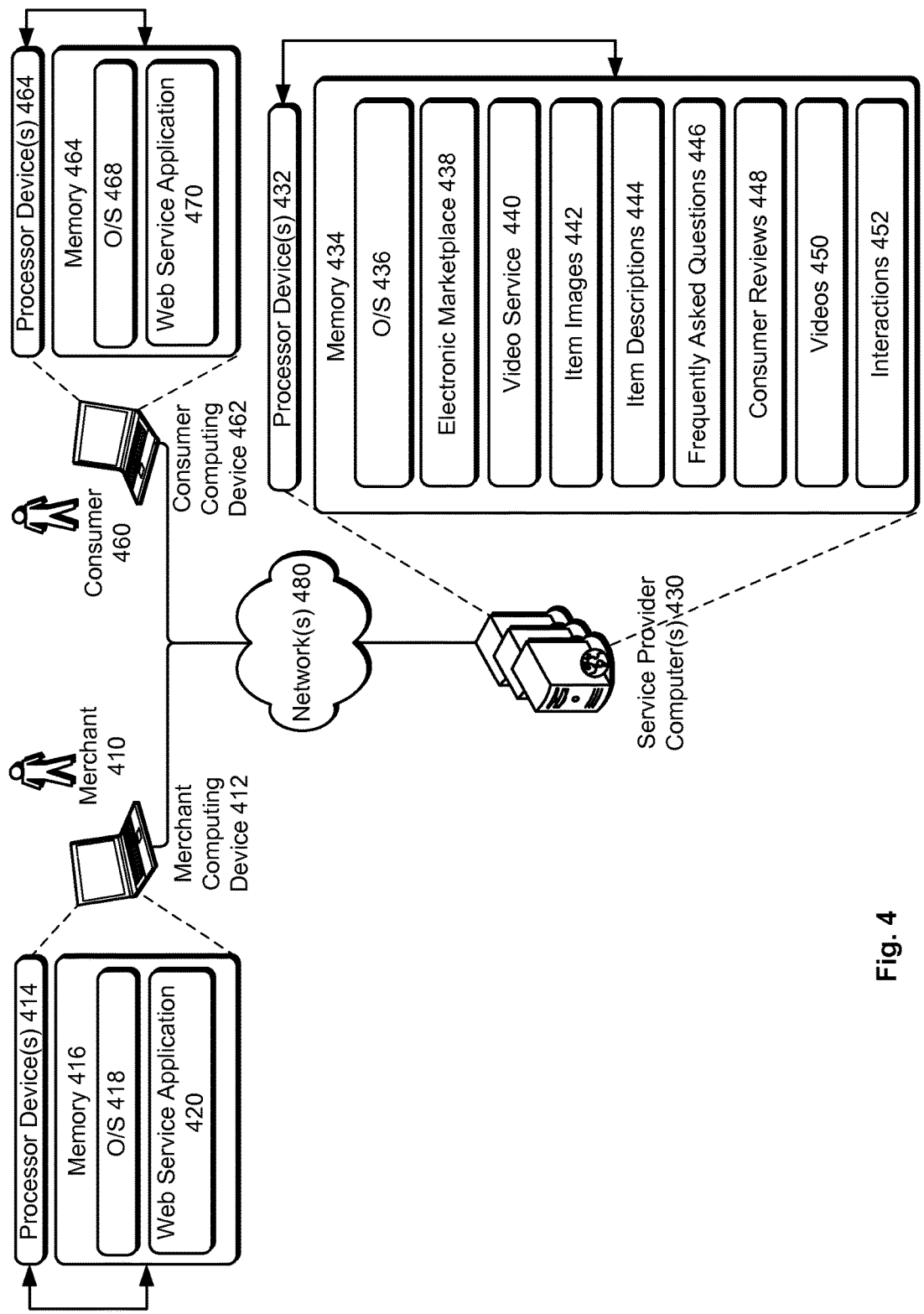
FIG. 4 illustrates an example architecture for providing a network-based resource, including at least one user device and/or one or more service provider computers connected via one or more networks, according to embodiments.

Turning to FIG. 4, that figure illustrates an example end-to-end computing environment for generating and updating videos. In this example, a service provider may implement a video service, such as the video service 314 of FIG. 3, within the context of, for example, an electronic marketplace available to users, such as the merchants 330 and the consumers 340 of FIG. 3.

In a basic configuration, a merchant 410 may utilize a merchant computing device 412 to access local applications, a web service application 420, a merchant account accessible through the web service application 420, a web site or any other network-based resources via one or more networks 480. In some aspects, the web service application 420, the web site, and/or the merchant account may be hosted, managed, and/or otherwise provided by one or more computing resources of the service provider, such as by utilizing one or more service provider computers 430. The merchant 410 may use the local applications and/or the web service application 420 to interact with the network-based resources of the service provider. These transactions may include, for example, offering items for sale.

In some examples, the merchant computing device 412 may be any type of computing devices such as, but not limited to, a mobile phone, a smart phone, a personal digital assistant (PDA), a laptop computer, a thin-client device, a tablet PC, etc. In one illustrative configuration, the merchant computing device 412 may contain communications connection(s) that allow the merchant computing device 412 to communicate with a stored database, another computing device or server, merchant terminals, and/or other devices on the networks 480. The merchant computing device 412 may also include input/output (I/O) device(s) and/or ports, such as for enabling connection with a keyboard, a mouse, a pen, a voice input device, a touch input device, a display, speakers, a printer, etc.

The merchant computing device 412 may also include at least one or more processing units (or processor device(s)) 414 and one memory 416. The processor device(s) 414 may be implemented as appropriate in hardware, computer-executable instructions, firmware, or combinations thereof. Computer-executable instruction or firmware implementations of the processor device(s) 414 may include computer-executable or machine-executable instructions written in any suitable programming language to perform the various functions described.

The memory 416 may store program instructions that are loadable and executable on the processor device(s) 414, as well as data generated during the execution of these programs. Depending on the configuration and type of merchant the computing device 412, the memory 416 may be volatile (such as random access memory (RAM)) and/or non-volatile (such as read-only memory (ROM), flash memory, etc.). The merchant computing device 412 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 416 may include multiple different types of memory, such as static random access memory (SRAM), dynamic random access memory (DRAM), or ROM.

Turning to the contents of the memory 416 in more detail, the memory may include an operating system (O/S) 418 and the one or more application programs or services for implementing the features disclosed herein including the web service application 420. In some examples, the merchant computing device 412 may be in communication with the service provider computers 430 via the networks 480, or via other network connections. The networks 480 may include any one or a combination of many different types of networks, such as cable networks, the Internet, wireless networks, cellular networks, and other private and/or public networks. While the illustrated example represents the merchant 410 accessing the web service application 420 over the networks 480, the described techniques may equally apply in instances where the merchant 410 interacts with the service provider computers 430 via the merchant computing device 412 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a consumer 460 may utilize consumer computing device 462 to access local applications, a web service application 470, a consumer account accessible through the web service application 470, a web site, or any other network-based resources via the networks 480. In some aspects, the web service application 470, the web site, and/or the user account may be hosted, managed, and/or otherwise provided by the service provider computers 430 and may be similar to the web service application 420, the web site accessed by the computing device 412, and/or the merchant account, respectively.

The consumer 460 may use the local applications and/or the web service application 470 to conduct transactions with the network-based resources of the service provider. These transactions may include, for example, searching for items offered by the merchant 410 at the network-based resources, ordering items, viewing videos, providing consumer reviews, asking questions, answering questions, commenting on videos, and other transactions.

In some examples, the consumer computing device 462 may be configured similarly to the merchant computing device 412 and may include at least one or more processing units (or processor device(s)) 464 and one memory 466. The processor device(s) 464 may be implemented as appropriate in hardware, computer-executable instructions, firmware, or combinations thereof similarly to the processor device(s) 414. Likewise, the memory 466 may also be configured similarly to the memory 416 and may store program instructions that are loadable and executable on the processor device(s) 464, as well as data generated during the execution of these programs. For example, the memory 466 may include an operating system (O/S) 468 and the one or more application programs or services for implementing the features disclosed herein including the web service application 470.

As described briefly above, the web service applications 420 and 470 may allow the merchant 410 and consumer 460, respectively, to interact with the service provider computers 430 to conduct transactions involving items. The service provider computers 430, perhaps arranged in a cluster of servers or as a server farm, may host the web service applications 420 and 470. These servers may be configured to host a web site (or combination of web sites) viewable via the computing devices 412 and 462. Other server architectures may also be used to host the web service applications 420 and 470. The web service applications 420 and 470 may be capable of handling requests from many merchants 410 and consumers 460, respectively, and serving, in response, various interfaces that can be rendered at the computing devices 412 and 462 such as, but not limited to, a web site. The web service applications 420 and 470 can interact with any type of web site that supports interaction, including social networking sites, electronic retailers, informational sites, blog sites, search engine sites, news and entertainment sites, and so forth. As discussed above, the described techniques can similarly be implemented outside of the web service applications 420 and 470, such as with other applications running on the computing devices 412 and 462, respectively.

The service provider computers 430 may, in some examples, provide network-based resources such as, but not limited to, applications for purchase and/or download, web sites, web hosting, client entities, data storage, data access, management, virtualization, etc. The service provider computers 430 may also be operable to provide web hosting, computer application development, and/or implementation platforms, or combinations of the foregoing to the merchant 410 and consumer 460.

The service provider computers 430 may be any type of computing device such as, but not limited to, a mobile phone, a smart phone, a personal digital assistant (PDA), a laptop computer, a desktop computer, a server computer, a thin-client device, a tablet PC, etc. The service provider computers 430 may also contain communications connection(s) that allow service provider computers 430 to communicate with a stored database, other computing devices or server, merchant terminals, and/or other devices on the network 480. The service provider computers 430 may also include input/output (I/O) device(s) and/or ports, such as for enabling connection with a keyboard, a mouse, a pen, a voice input device, a touch input device, a display, speakers, a printer, etc.

Additionally, in some embodiments, the service provider computers 430 may be executed by one more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider computers 430 may be in communication with the computing devices 412 and 462 via the networks 480, or via other network connections. The service provider computers 430 may include one or more servers, perhaps arranged in a cluster, or as individual servers not associated with one another.

In one illustrative configuration, the service provider computers 430 may include at least one or more processing units (or processor devices(s)) 432 and one memory 434. The processor device(s) 432 may be implemented as appropriate in hardware, computer-executable instructions, firmware, or combinations thereof. Computer-executable instruction or firmware implementations of the processor device(s) 432 may include computer-executable or machine-executable instructions written in any suitable programming language to perform the various functions described.

The memory 434 may store program instructions that are loadable and executable on the processor device(s) 432, as well as data generated during the execution of these programs. Depending on the configuration and type of the service provider computers 430, the memory 434 may be volatile (such as random access memory (RAM)) and/or non-volatile (such as read-only memory (ROM), flash memory, etc.). The service provider computers 430 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 434 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 434 in more detail, the memory may include an operating system (O/S) 436, code for an electronic marketplace 438, code for a video service 440, data related to item images 442, data related to item descriptions 444, data related to frequently asked questions 446, data related to consumer reviews 448, data related to video 450, and data related to interactions 452. The video service 440 may be a service similar to the video service 314 of FIG. 3. Although FIG. 4 illustrates the various data as stored in the memory 434, this data or portion of the data may be additionally or alternatively stored at a storage device remotely accessible to the service provider computers 430. Configurations and operations of the video service 440 are further described in greater detail below with reference to at least FIGS. 5-7.

Turning to FIGS. 5-7, those figures illustrate example flows for providing a video presenting information about an item. More particularly, FIG. 5 illustrates an example high-level flow for generating and updating the video. In comparison, FIG. 6 illustrates a more detailed example flow for generating the video, while FIG. 7 illustrates a more detailed example flow for updating the video. Operations of the example flow of FIG. 5 may be further embodied in operations of the example flows of FIGS. 6 and 7. Thus, some operations may be similar. Such similarities are not repeated herein in the interest of clarity of explanation.

Further, in the illustrative operations, each of the operations or functions may be embodied in, and fully or partially automated by, modules executed by one or more processor devices of a computing device. Although a video service, such as the video service 314 of FIG. 3 or the video service 440 of FIG. 4, is illustrated as performing operations of the flows, other or a combination of other services and modules may be additionally or alternatively used. Also, while the operations are illustrated in a particular order, it should be understood that no particular order is necessary and that one or more operations may be omitted, skipped, and/or reordered.

The example flow of FIG. 5 may start at operation 502, where a video service may generate a video for presenting information about an item. This may involve a multi-step process. For example, the video service may identify images of the item. These images may be the most useful images for providing information about the item from different perspectives. The video service may also identify what data, in addition to the images, should be included in the video. This data may be referred to as non-image data and can include descriptions of features of the item. These features may be features of interest to consumers. The video may generate, out of the non-image data, a text file and/or an audio file for addition to the video. The video service may further group the images, text files, and audio files in segments, order the segments in a particular order, and associate each segment with a presentation length to generate the video. The order of a segment within a sequence and the length of the segment may be function of how relevant the feature described in the segment may be relative to relevance of other features described in other segments. The video service may define and store the video in a document, such an XML document. FIG. 6 further illustrates an example flow for performing operation 502.

The operation 502 may also include providing the video to an editing service for editing the video before publishing. The editing service may be associated with a service provider of an electronic marketplace, with a merchant offering the item at the electronic marketplace, or with a third party. The editing service may provide an interface to a user (e.g., the service provider, merchant, or third party) to further update the video by, for example, re-ordering the sequence of segments, modifying the lengths of the segments, and/or editing content of the segments (e.g., adding, deleting, replacing, or editing images, text, and/or audio files). If edited, the video service may receive the video for publication.

At operation 504, the video service may publish the video. Alternatively, the video service may store the video or may interface with a publishing service that may receive or access the video for publishing. The publishing may involve, for example, associating the video with a network-based resource (e.g., a web page) of the electronic marketplace providing information about the item. As such, when a potential consumer operates a computing device to access the network-based resource, the video can be displayed in conjunction with other information about the item. In a more specific example, the consumer may operate a browser that may support Adobe® Flash Player®. When the browser renders a web page about the item, the Adobe® Flash Player® may render the video within the web page based on the XML document.

At operation 506, the video service may track metrics associated with viewing the video and/or ordering the item. Alternatively, the video service may access the metrics from storage or may interface with a tracking service that may track and store the metrics. The metrics may describe user interactions with the network-based resource to view the video and to order the item. For example, the metrics may indicate various actions that the consumer may have performed in viewing the video, such as playing, pausing, rewinding, stopping, forwarding, or skipping segments or portions of the video and for how long and/or how frequent the actions may have been performed. The metrics may also indicate whether the consumer ordered the item or not, or at a more granular level, whether the consumer ordered the item or not in association with performing one or more of the actions associated with viewing the video. The metrics may also indicate attributes about the consumer, such as whether the consumer may have a certain membership at the electronic marketplace, spending habit, location, and other consumer attributes.

At operation 508, the video service may update the video based on the tracked metrics. For example, the video service may analyze the metrics to determine whether editing the video would provide a better consumer experience by allowing the consumer to more easily make an order or purchase decision. The analysis may indicate that certain segments of the video may be more relevant to consumers than others. As such, the video service may re-arrange the sequence of segments, change a length of a segment, or edit content of a segment. Once updated, the video service may publish the updated video to replace the previous version and/or may provide the updated video to the editing service.

Turning to FIG. 6, that figure illustrates an example flow for generating a video that may present information about an item. The example flow of FIG. 6 may start at operation 602, where a video service may determine images of interest that may show the item. Generally, images may be retrieved from storage and may be associated with a network-based resource (e.g., a web page) of an electronic marketplace offering the item. Additionally or alternatively, the images may be received from merchants or consumers, or may be retrieved from a third party resource (e.g., a web site of a manufacturer of the item).

To determine which of the images may be of interest, the video service may implement various techniques. In one technique, the video service may consider the number of views of an image. In other words, users may operate computing devices to view the image by accessing the network-based resource and/or by clicking on a button, link, or thumbnail of the image. The number of views can be tracked per image. The video service may compare the number of views of an image to a threshold. If the number of views exceeds the threshold, the video may determine that the image may be of interest. In an example, the threshold can be pre-defined by the service provider. In another example, the threshold can be based on the total number of views per images of the item, such as the average number or a percentage of the total number of views. In yet another example, the threshold can define a number of images (e.g., ten images or another number of images). In this case, the video service may determine that the top number of images (e.g., the top ten images) with the highest number of views may be the images of interest.

In another technique, instead of or in addition to using the number of views, the video service may consider the "likes" of an image. A like may represent a positive review. In an example, when the network-based resource displays an image, the network-based resource may also provide an option (e.g., a button) to "like" the image. As such, users may select this option (e.g., by operating computing devices, select the "like" button). In turn, the number of likes can be tracked per image. The video service may implement a similar threshold process as above to determine the images of interest based on the number of likes.

In yet another technique, the video service may implement image detection and/or machine learning algorithms to determine the images of interest. For example, the video service may access a list of relevant features of the item and may analyze an image, by implementing an image detection algorithm, to determine whether the image shows some of these features. If so, the video service may determine that the image may be of interest. The list of relevant features may be pre-defined based on, for example, input from the service provider, merchants, or consumers. Additionally or alternatively, the list of relevant features may be determined by processing information about the item, such as an item description, frequently asked questions, and/or consumer reviews through a machine learning algorithm.

In a further technique, the video service may interface with an image selection service for determining the images of interest. The image selection service may be configured to implement the above techniques and/or other techniques. For example, the image selection service may implement a manual process by which images may be reviewed, filtered into images of interest and not of interest, and ranked for relevance. In response to providing an image to the image selection service, the video service may receive an indication of whether the image may be of interest and an associated relevance.

Once the images of interest are identified, the video service may rank the images of interest. The ranking process may depend on the above techniques. For example, if the number of views or likes is used, the video service may rank the images based on the corresponding number of views or likes. For instance, the more views or likes an image has, the higher that image may be ranked. Similarly, if image detection and machine learning algorithms are used, the output of the algorithms can include the image ranking. For example, the controls of the machine learning algorithm can be configured to output the image ranks. Similarly, the image detection algorithm can be configured to compare images for how well each image may show a feature and can output the ranks accordingly.

Further, the video service may edit the images for uniformity. For example, the video service may resize the images, adjust the brightness, and tone the images by applying image correction algorithms. This may allow a certain level of style consistency between the images when presented in the video.

At operation 604, the video service may determine non-image data that should be presented along with the images of interest in the video. Non-image data may describe various features of the item. These features may also be of interest to consumers. As such, the video may identify these features and the associated relevance, and may determine the corresponding data. To do so, the video service may implement various techniques.

In one technique, the video service may analyze the frequently asked questions. For example, the video service may consider the most frequently asked questions, or questions asked over a certain threshold. In another example, the video service may consider the highest rated questions, or questions rated over a certain threshold. The considered questions can be parsed to determine a relevant feature (e.g., by applying text recognition, the video service may determine that a question may ask about a watch wristband length). Similarly, the video service may consider the highest rated answer to that question, an answer rated over a certain threshold, or an answer most frequently used. The video service may parse this answer to determine the data (e.g., by applying text recognition, the video service may determine that an answer may be six inches).

In yet another technique, the video service may apply statistical algorithms in analyzing the frequently asked questions. For example, the video service may parse the different questions to determine potential features and frequencies of use in the questions of the potential features. If a feature has a frequency over a certain threshold (e.g., over an average, or within a certain percentile), the video service may determine that the feature may be of interest. Accordingly, the video service may parse the answers for data about the feature. If resulting data from different answers is conflicting, a similar statistical algorithm may be applied to the answers, or the video service may select the data from the highest rated answer.

In a further technique, the video service may apply machine learning algorithms in analyzing the questions. For example, a random forest machine approach may be implemented, where the frequently asked questions may be inputted, and where the features of interest and associated data may be outputted.

In addition or alternative to frequently asked question, the video service may consider other information, such as consumer reviews, item descriptions, and/or a combination of frequently asked questions, consumer reviews, and item descriptions. The video service may apply similar techniques as above to this information to derive the features of interest and the associated no-image data.

Further, the video service may augment the considered information. For example, the video service may also apply similar techniques as above, but for similar information (e.g., a combination of frequently asked questions, consumer reviews, and item descriptions) associated with similar items. A similar item may be an item belonging to a same category as the item. For example, if a video for a digital sports watch should be generated, frequently asked questions, consumer reviews, and/or item descriptions of another watch, another digital watch, another sports watch, or another digital sports watch may be also analyzed.

Once the non-image data is determined, the video service may rank the non-image data, or the features of interest, based on relevance. The ranking process may depend on the above techniques. For example, if frequency of use or rating is used, the video service may rank the features based on the corresponding frequencies or ratings. For instance, the more frequently a feature is used or the higher rating the feature has, the higher the feature may be ranked. Similarly, the more frequently a question or answer containing a feature is used or the higher the corresponding rating is, the higher that feature may be ranked. In another example, if machine learning algorithms are used, the output of the algorithms can include feature ranks. For example, the controls of the machine learning algorithm can be configured to output the feature ranks.

Further, the video service may generate text and audio files based on the non-image data. For example, the data can be translated into a certain language (e.g., English) or a number of languages (e.g., English and French) to generate a text file. Similarly, the video service may implement a text-to-speech algorithm to generate the audio files. If multiple languages are used, the video service may tag the text and audio files accordingly. As such, based on a consumer attribute (e.g., a location of a consumer), when the video is displayed to the consumer, the text can be displayed in a corresponding language and the audio file can be played in that language (e.g., French for a consumer in France).

Once the various files are generated, the video service may associate these files with the images of interest. This may involve associating the images of interest with the features of interest and using that association to link the text and audio files to the images. For example, the video service can implement image detection and/or machine learning algorithms to analyze the images of interest and to output the features shown in each image accordingly. In another example, the video service can provide the images to the image selection service and may receive a list of features associated with each of the images. If an image of interest is not associated with a feature of interest (e.g., does not show any feature of interest), that image may be discarded from the analysis. Conversely, if a feature of interest is not associated with an image of interest, a new and appropriate image may be fetched and used. For example, the video service may retrieve such an image from a third party resource or may cause a notification and provide an interface to the service provider or a merchant to provide the image. Otherwise, each image may be associated with at least a text file or at least an audio file based on the feature of interest that the image may be associated with.

At operation 606, the video service may determine video parameters for generating the video based on the images of interest and the non-image data (e.g., text and audio files). The video parameters may indicate a number of segments, a number of images, a grouping of the images into segments, a sequence of the segments, a length for each segment, and/or other parameters.

Generally, the number of segments and the number of images may be a function of the complexity of the item. For example, the more complex the item may be, the more features the item may include, and the more questions the consumers may have. Accordingly, the number of segments and images may be greater.

Further, the video service may group a set of images within one segment, such that each segment may include one or more images. The grouping can be based on the features that the images may be associated with. For example, images associated with a same feature of interest may be grouped within a same segment. The video service may associate that segment with the feature, and may rank that segment relative to other segments based on the rank of the images in the segment and/or the feature. For example, the rank may be an averaged sum of the image ranks, the feature rank, or an averaged sum of the image ranks and the feature rank. This process can be repeated to group images showing more than one common feature in a segment. In other words, a segment may not only include more than one image, but may also show more than one feature.

The sequence of the segments and the length of each segment may depend on the corresponding segment ranks In other words, the sequence and lengths may depend on the ranks of the images and/or features that the segments include, which in turn may depend on the relevance of the images and/or features. As such, higher feature relevance may produce a higher-ranked segment. In an example, the video service may sequence the segments in a decreasing or an increasing order of relevance (e.g., segment ranks). Similarly, the video service may increase a length of a segment with an increase in the rank of that segment. A higher ranked segment may be longer than a lower ranked segment.

At operation 608, the video service may determine video rules. Generally, video rules may specify criteria for presenting a video and may not depend on the actual content of the video. For example, the service provider may predefine the video rules to indicate how long a video may be, a frame rate for displaying the video, a resolution (e.g., in megapixels), a total size of the video (e.g., in megabytes), and other rules. However, the video rules may depend on the item. For example, a more complex item may produce a longer video. Further, the video rules may specify fields that can be added to the video, or that can be used in conjunction with displaying the video. For example, the video rules may specify that a "like" field should be added to the video or to each segment of the video, or that a tracking of how the video may be displayed by computing devices should be implemented. The video service may access and apply these rules by, for example, adding appropriate fields to the video or setting the total length, total size, resolution, or frame rate of the video.

At operation 610, the video service may generate the video. For example, the video service may group the images and the non-image data into segments. The video service may also configure the segments (e.g., sequence and lengths) based on the video parameters and may configure the overall video based on the presentation rules. The definition of the video may be captured in an XML document as described herein above.

Turning to FIG. 7, that figure illustrates an example flow for updating a video. Briefly, after a video has been published at an electronic marketplace, a video service may track various metrics associated with interactions between users of the electronic marketplace and the video and metrics associated with order or purchase decisions. Based on the metrics, the video service may update or recommend an update to the video such that the updated video may further enhance the consumer's experience.

The example flow of FIG. 7 may start at operation 702, where a video service may receive update parameters. Generally, an update parameter may include an indication that an update to a sequence of segments, a length of a segment, or content of a segment may be recommended. This indication may be derived by tracking and analyzing metrics about user interactions related to viewing the video and/or making an order or purchase decision. In an example, the video service may track or access different types of metrics from storage.

A first type of metrics may be associated with various actions that a user may have performed in association with viewing the video, such as playing, pausing, rewinding, stopping, forwarding, or skipping segments or portions of the video and for how long and/or how frequent the actions may have been performed. Another type of metrics may relate to data indicating whether the consumer ordered the item or not, or at a more granular level, whether the consumer ordered the item or not in association with performing one or more of the actions associated with viewing the video. Yet another type of metrics may also indicate attributes about the consumer, such as whether the consumer may have a certain membership at the electronic marketplace, spending habit, location, and other consumer attributes. A further type of metrics may include a number of views of the video. A similar type of metrics may include a number of "likes" of the video. Yet another type of metrics may include consumer reviews of consumers of the video. Such reviews may be provided by users under, for example, the consumer reviews. Another type of metrics may also include new features identified under the frequently asked questions and/or consumer reviews. For example, after the video may have been published, users reviewing the video may have additional comments, questions, or answers about certain features shown or not shown in the video. Accordingly, the users may provide such information under the frequently asked questions and/or consumer reviews. The video service, or another service, may analyze this information to derive the metrics, similarly to the operations of the example flow of FIG. 6. An additional type of metrics may include similar metrics as the various types described herein, but may relate to other items in a same category of items. This type of metrics may be helpful in situations where, for example, another similar item may be more popular. Accordingly, the video of this more popular item may be viewed by a larger number of users, which may provide a better or a larger set of metrics to analyze. Because of the similarities between the two items (e.g., because the items may belong to a same category, the items may have common features), a recommended update to the more popular video may also apply to the less popular video.

At operation 704, the video service may analyze the update parameters to determine recommended updates to the video. Generally, the video service may implement a machine learning algorithm, such as an algorithm that may use a random forest approach and may input a combination of the various types of metrics into the algorithm. In turn, the algorithm may output the recommended updates. The recommended updates can indicate whether the sequence of segments, a length of a segment, or content (e.g., images, text, and/or audio) of a segment should be modified. The recommended updates may include a change to the segment ranks. As such, if a rank for a particular segment is increased, the recommended update can indicate that the sequence should be reordered or that the length of that particular segment should be increase. Conversely, if the rank decreases, the sequence should also be reordered accordingly and the length should be shortened. Similarly, if the rank decreases and falls below a threshold, the recommended update can indicate a recommendation for removing that segment from the video.

At a more granular level, the inputted metrics may be controlled (e.g., varied across the regression models that the machine learning algorithm may implement) to output particular recommendations, including ranks. For example, by focusing on (e.g., giving more weight, or setting as an independent variable in the algorithm) the metrics related to the various user actions (e.g., play, pause, etc. and/or associated length or frequency), the recommended update can be a function of these metrics. For instance, if certain segments are typically skipped, a recommended update may include deleting those segments. Similarly, if certain segments are typically viewed in an order different from the sequence, a recommended update may include rearranging the sequence according to the order. Likewise, if a particular segment is viewed most frequently or most of the viewing time is spent on viewing that particular segment, a recommended update may include lengthening that segment.

In another example, by considering the order or purchase decisions, the video service may determine a recommended update that may increase the frequency of decisions to purchase the item. For example, the machine learning algorithm may output a determination of how frequently consumers purchase the item after viewing the video. This determination can be expressed as a likelihood of an order or purchase decision. The video service may compare that frequency or the likelihood to a threshold. If lower, a recommended update may include rearranging the sequence or some other type of change. The video service may further conduct A/B testing. For instance, the video may update and publish the video based on the recommended update and track the number of subsequent order or purchase decisions. If the frequency or likelihood is increased and exceeds the threshold, no further update may be needed. Otherwise, the video service may rearrange the video in a different order and conduct the A/B testing again.

In a further example, by considering attributes of the consumers, the video service may determine recommended updates that may customize the video based on the attributes. For instance, if the machine learning algorithm outputs a determination that the video is not popular in a certain location with a spoken language not supported in the video, the video service may edit the content of the video to add an audio file using that language.

In yet another example, by considering the number of views, likes, and/or consumer reviews of the video, a recommended update may be a function of this information. For instance, if a segment of the video has the highest number of views or likes, the rank of that segment may be updated accordingly. This may result in a recommendation to rearrange the sequence to show the segment at the start of the video and to increase the corresponding length. Similarly, if consumer reviews found a particular segment interesting or not helpful, the rank of that segment can be changed accordingly, resulting in a recommended update.

By also considering metrics of similar items, the size of the metrics inputted in the machine learning algorithm may increase and may allow for further refined controls based on the similar features between the items. As such, the video of the item may be updated based on metrics and lessons learned that may be associated with videos of the other items. For instance, if metrics of a video of a similar item reveals that a particular feature should be emphasized more, a recommended update for the video of the item at hand can include increasing the rank of the segment showing the similar feature. In another example, the video service may propagate changes made to the video of the similar item to the video at hand. For example, if the two videos show watch wristbands, but the other video was updated to delete corresponding segments, the video at hand can be similarly updated.

In yet another example, the video service can compare segments from each video of the similar items and may propagate changes across segments showing a same or similar feature. For instance, the video service may consider a first segment of a first video (e.g., the video at hand) and may determine the feature that may be shown in that segment. Similarly, the video service may determine a second segment of the second video (e.g., the video of the similar item) and may determine that this segment may also show the same feature. Further, based on how frequently the second segment is shown and whether that frequency exceeds a threshold, or some other metric as described above, the video service may determine that an update to the second segment (e.g., rearranging the sequence or lengthening the segment) may not be limited to the second presentation, and may likewise be propagated to the first video. As such, the video service may update the first video accordingly.

At operation 706, the video service may determine update rules. Generally, update rules may specify criteria for updating a video and may not depend on the actual content of the video. For example, the service provider may predefine the update rules to indicate that the total length of a video may not be changed, that transition time between segments cannot be changed, that a segment at the start of the video can be changed, but one at the end of the video cannot be changed, and other rules. The video service may access and apply these rules from storage.

At operation 708, the video service may modify the video. For example, the video service may rearrange the sequence, change the lengths, and/or edit the content of the segments based on the recommended updates and may edit the overall video based on the update rules. Once updated, the video service may republish the video. Additionally or alternatively, the video service may cause a notification and provide an interface to the service provider or a merchant to review the recommended updates or the updated video. In that case, the service provider and/or the merchant may use the interface to further edit and/or to republish the video.

Figure 8:
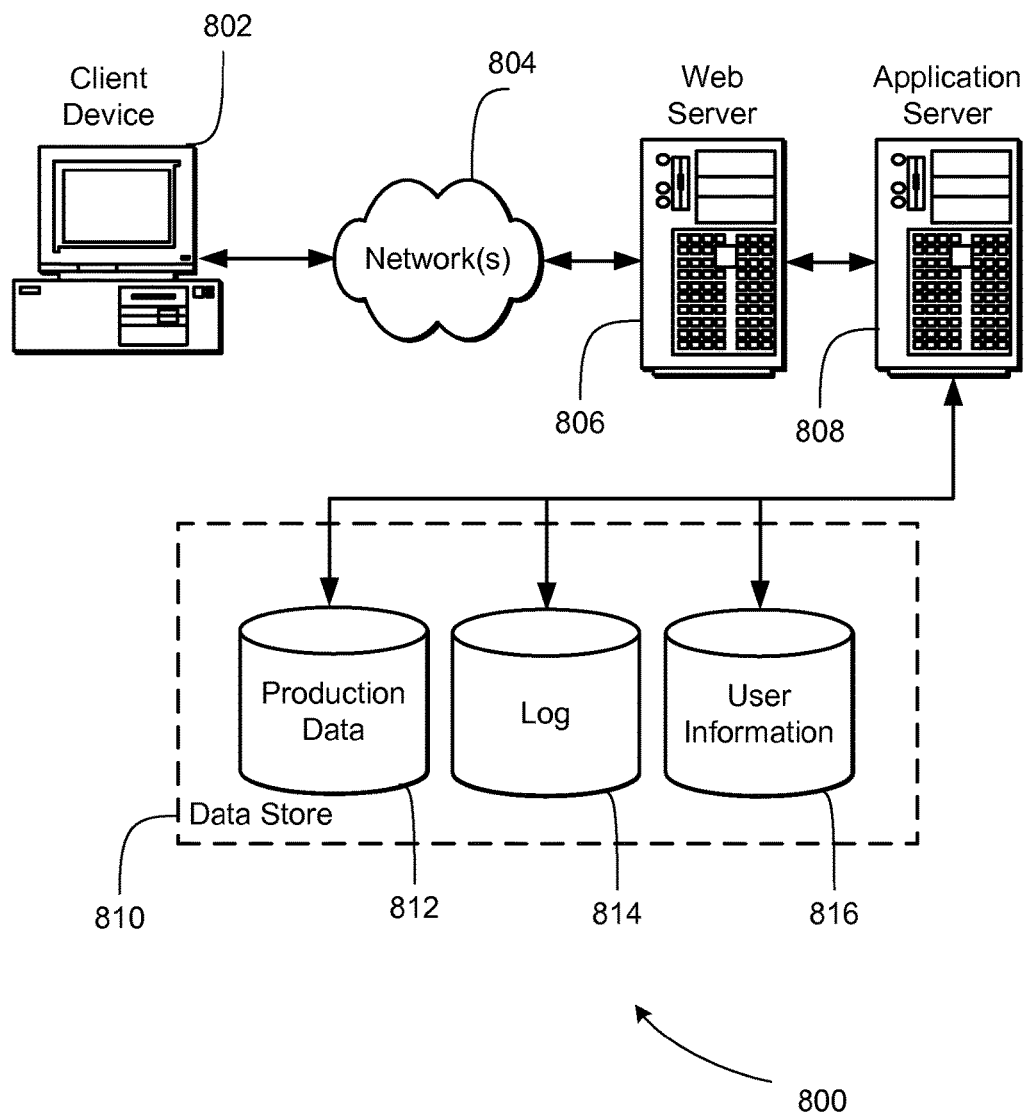
FIG. 8 illustrates an environment in which various embodiments can be implemented.

Turning to FIG. 8, the figure illustrates aspects of an example environment 800 capable of implementing the above-described structures and functions. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network(s) 804 and convey information back to a user of the device. Examples of such client devices include personal computers, cell phones, handheld messaging devices, laptop computers, set-top boxes, personal data assistants, electronic book readers, or any other computing device. The network(s) 804 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, and the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server 808 provides access control services in cooperation with the data store 810, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers 806 and 808 are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store 810 illustrated includes mechanisms for storing production data 812 and user information 816, which can be used to serve content for the production side. The data store 810 is also shown to include a mechanism for storing log data 814, which can be used for reporting, analysis, or other such purposes. It should be understood that there can be many other aspects that may need to be stored in the data store 810, such as for page image information and to access correct information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the client device 802. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of environment 800 in FIG. 8 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving, by a computer system, information about an item offered by an electronic marketplace, the information comprising images that show features of the item, the information further comprising consumer reviews of the features;

ranking, by the computer system, the features of the item based at least in part on the consumer reviews;

generating, by the computer system, a video about the item based at least in part on the information about the item, the video comprising a plurality of video segments ordered in a sequence, the video generated according to a video generation rule by at least:

generating a particular video segment that comprises an image and an identifier separate from the image, the image being one of the images, the image showing a feature of the features, the identifier identifying the feature;

determining, based at least in part on the ranking of the features, that the feature has a higher ranking than that of another feature shown in another image of another video segment;

setting a presentation length of the particular video segment based at least in part on the higher ranking of the feature, the particular video segment being longer than the other video segment based at least in part on the higher ranking of the feature;

including the particular video segment in a location in the sequence based at least in part on the higher ranking of the feature, the particular video segment located ahead of the other video segment based at least in part on the higher ranking of the feature; and generating a markup document that identifies the plurality of video segments, the sequence, the presentation length of the particular video segment, and the location of the particular video segment in the sequence;

providing, by the computer system, the markup document to a browser that renders a web page about the item based at least in part on the markup document;

tracking, by the computer system, interactions between a computing device of a user and the electronic marketplace, the interactions comprising first data associated with the displaying of the video in the web page, the interactions further comprising second data associated with ordering the item based at least in part on viewing at least a portion of the video in the web page;

modifying, by the computer system, the markup document based at least in part on the interactions by at least one of re-ordering the sequence of the plurality of video segments, updating the presentation length of the particular video segment, or editing content of the particular video segment; and providing, by the computer system, the modified markup document for subsequent use in association with offering the item by the electronic marketplace.

2. The computer-implemented method of claim 1, wherein modifying the video based at least in part on the interactions comprise:

analyzing the first data associated with the displaying of the video and the second data associated with ordering the item from the electronic marketplace to generate ranks for the plurality of video segments;

rearranging the sequence of the plurality of video segments based at least in part on the ranks; and modifying the presentation length of the particular video segment based at least in part on a rank of the particular video segment.

3. The computer-implemented method of claim 2, wherein the first data comprises metrics about the particular video segment, and wherein the metrics comprise one or more of a frequency of playing the particular video segment, a frequency of skipping the particular video segment, a frequency of pausing the particular video segment, a number of views of the particular video segment, or a number of positive reviews of the particular video segment.

4. The computer-implemented method of claim 3, wherein the rank of the particular video segment is updated relative to another rank of the other video segment based at least in part on a comparison of the metrics of the particular video segment and corresponding metrics of the other video segment.

5. One or more non-transitory computer-readable storage media storing computer-executable instructions that, when executed by one or more computer systems, configure the one or more computer systems to perform operations comprising:

ranking features of an item available in an electronic marketplace based at least in part on reviews of the item, the features shown in images of the item;

generating a video about the item based at least in part on a video generation rule, the video comprising segments ordered in a sequence, the video generated by at least:

generating a first segment of the video, the first segment comprising a first image and an identifier separate from the first image, the first image being one of the images, the first image showing a first feature of the features, the identifier identifying the feature;

determining, based at least in part on the ranking of the features, that the first feature has a higher ranking than that of a second feature shown in a second image of a second segment of the video;

setting a presentation length of the first segment based at least in part on the higher ranking of the first feature, the first segment being longer than the second segment based at least in part on the higher ranking of the first feature;

including the first segment in a location in the sequence based at least in part on the higher ranking of the first feature, the first segment located ahead of the second segment based on at least in part on the higher ranking of the first feature; and generating a markup document that identifies the plurality of segments, the sequence, the presentation length of the first segment, and the location of the first segment in the sequence;

providing the markup document to a browser that renders a network-based resource based at least in part on the markup document;

tracking first metrics associated with interaction between a user device and the video presented in the network-based resource;

tracking second metrics associated with an order for the item; and updating the markup document based at least in part on the first metrics and the second metrics.

6. The one or more non-transitory computer-readable storage media of claim 5, wherein updating the markup document comprises rearranging the segments of the video.

7. The one or more non-transitory computer-readable storage media of claim 5, wherein the first segment of the video further comprises text describing the feature of the item and an audio file describing the feature of the item.

8. The one or more non-transitory computer-readable storage media of claim 7, wherein generating the video further comprises selecting the feature from the features of the item based at least in part on an analysis of one or more of descriptions, and frequently asked questions associated with the item.

9. The one or more non-transitory computer-readable storage media of claim 8, wherein the image is selected from the images based at least in part on the feature, wherein the text is generated based at least in part on the analysis of the one or more of the descriptions, the reviews, or the frequently asked questions, and wherein the audio file is generated based at least in part on the text.

10. The one or more non-transitory computer-readable storage media of claim 5, wherein tracking the first metrics comprises receiving first data from the user device, wherein the first data comprises a first indication of one or more of playing a segment of the video, skipping the segment, pausing the segment, or providing a review of the segment, and wherein tracking the second metrics comprises receiving second data from the user device comprising a second indication of ordering the item.

11. The one or more non-transitory computer-readable storage media of claim 5, wherein updating the markup document comprises updating the sequence of the segments of the video by at least:

ranking the first segment relative to the second segment based at least in part on the first metrics and the second metrics; and rearranging the sequence based at least in part on the ranking of the first segment.

12. The one or more non-transitory computer-readable storage media of claim 11, wherein the ranking of the first segment is based at least in part on a frequency of displaying the first segment at user devices, wherein the frequency is determined based at least in part on the first metrics, and wherein the ranking of the first segment is increased relative to second segment based at least in part on an indication that the first segment is viewed more frequently than the second segment.

13. The one or more non-transitory computer-readable storage media of claim 11, wherein the ranking of the first segment is based at least in part on a likelihood of ordering the item, wherein the likelihood is determined based at least in part on the second metrics, and wherein the ranking of the first segment is increased based at least in part on an increase in the likelihood of ordering the item.

14. A system, comprising:
- a memory configured to store computer-executable instructions; and
- a processor configured to access the memory and execute the computer-executable instructions to collectively at least:
  - rank features of an item available in an electronic marketplace based at least in part on reviews of the item, the features shown in images of the item;
  - generate a video about the item based at least in part on a video generation rule, the video comprising segments ordered in a sequence, the video generated by at least:
    - generating a particular segment of the video, the particular segment comprising an image and an identifier separate from the image, the image being one of the images, the image showing a feature of the features, the identifier identifying the feature;
    - determining, based at least in part on the rank of the features, that the feature has a higher ranking than that of another feature shown in another image of another segment of the video;
    - setting a presentation length of the particular segment based at least in part on the higher ranking of the feature, the particular segment being longer than the other segment based at least in part on the higher ranking of the feature;
    - including the particular segment in a location in the sequence based at least in part on the higher ranking of the feature, the particular segment located ahead of the other segment based on at least in part on the higher ranking of the feature; and
    - generating a markup document that identifies the plurality of segments, the sequence, the presentation length of the particular segment, and the location of the particular segment in the sequence;
  - provide the markup document to a browser that renders a network-based resource based at least in part on the markup document;
  - monitor viewing of the video on the network-based resource;
  - rank the particular segment of the plurality of segments based at least in part on the monitored viewing of the video; and
  - alter the sequence of the plurality of segments or edit the particular segment based at least in part on the rank of the particular segment.

15. The system of claim 14, wherein the video is generated based at least in part on frequently asked questions about the item.

16. The system of claim 15, wherein generating the video comprises:
- associating the feature with the particular segment based at least in part on the identifier;
- determining a first rank of the particular segment based at least in part on the feature; and
- arranging the particular segment and the other segment in the sequence based at least in part on the first rank of the particular segment and a second rank of the other segment.

17. The system of claim 16, wherein the feature of the item is determined is based at least in part on an analysis of the reviews of the item and the frequently asked questions about the item.

18. The system of claim 14, wherein the monitored viewing of the video comprises metrics associated with viewing the particular segment of the plurality of segments at user devices or reviews of the particular segment, and wherein the rank of the particular segment is a function of the metrics.

19. The system of claim 18, wherein the rank of the particular segment is increased based at least in part on an increase in viewing the particular segment at the user devices or an increase in positive reviews.

20. The system of claim 19, wherein editing the particular segment comprises increasing the presentation length for displaying the particular segment.

\* \* \* \* \*